United States Patent
Portnoy et al.

(10) Patent No.: US 10,437,907 B2
(45) Date of Patent: *Oct. 8, 2019

(54) LINK EXPANSION SERVICE

(71) Applicant: MICROSOFT TECHNOLOGY LICENSING, LLC, Redmond, WA (US)

(72) Inventors: William L. Portnoy, Woodinville, WA (US); Todd D. Newman, Mercer Island, WA (US); Steven W. Ickman, Snoqualmie, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/335,483

(22) Filed: Jul. 18, 2014

(65) Prior Publication Data

US 2014/0331116 A1 Nov. 6, 2014

Related U.S. Application Data

(62) Division of application No. 12/967,990, filed on Dec. 14, 2010, now Pat. No. 8,819,168.

(51) Int. Cl.
*G06F 1/00* (2006.01)
*G06F 16/955* (2019.01)
*G06F 3/0484* (2013.01)

(52) U.S. Cl.
CPC ...... *G06F 16/9566* (2019.01); *G06F 3/04842* (2013.01); *G06F 16/955* (2019.01)

(58) Field of Classification Search
CPC .......... G06F 3/04842; G06F 17/30887; G06F 17/3089; G06F 16/955; G06F 16/9566; G06Q 10/10

See application file for complete search history.

(56) References Cited

U.S. PATENT DOCUMENTS 7,747,781 B2   6/2010   Maurya et al.
7,877,407 B2   1/2011   Smith, III
(Continued)

OTHER PUBLICATIONS

"DIG35: Metadata Standard for Digital Images", Retrieved from: <http://xml.coverpages.org/dig35.html> on Oct. 19, 2010, Jun. 10, 2002, 11 pages.

(Continued)

*Primary Examiner* — Asad M Nawaz
*Assistant Examiner* — Syed Ali
(74) *Attorney, Agent, or Firm* — Shook, Hardy & Bacon, L.L.P.

(57) ABSTRACT

Various embodiments enable an application to obtain information associated with a link to content without navigating to the link. The application can be configured to identify a link, receive input to attain information associated with the link, and send a request to a service for the information. In one or more embodiments, a service can be configured to receive a request for information associated with a link, ascertain one or more sources from which to gather the information, determine appropriate mechanisms by which to obtain the information, and acquire the information. Alternately or additionally, the service can further assemble the information into a consumable format, and return the consumable format to a requesting application or device.

17 Claims, 8 Drawing Sheets

(56) References Cited

U.S. PATENT DOCUMENTS

| | | | |
|---|---|---|---|
| 8,041,703 B2 | 10/2011 | Rao et al. | |
| 8,214,432 B2 | 7/2012 | Bodin et al. | |
| 8,255,527 B2 | 8/2012 | Fernandez | |
| 8,281,232 B2 | 10/2012 | Vishria et al. | |
| 8,819,168 B2 | 8/2014 | Portnoy et al. | |
| 8,856,869 B1* | 10/2014 | Brinskelle | H04L 63/08 726/12 |
| 2004/0205114 A1 | 10/2004 | Kinoshita | |
| 2005/0015486 A1 | 1/2005 | Hugh et al. | |
| 2005/0138137 A1 | 6/2005 | Encarnacion et al. | |
| 2006/0070012 A1 | 3/2006 | Milener et al. | |
| 2006/0129906 A1 | 6/2006 | Wall | |
| 2006/0271303 A1 | 11/2006 | Manfredi et al. | |
| 2007/0136279 A1 | 6/2007 | Zhou et al. | |
| 2007/0208759 A1* | 9/2007 | von Koch | G06F 16/958 |
| 2007/0214097 A1* | 9/2007 | Parsons | G06Q 10/00 706/12 |
| 2008/0071872 A1* | 3/2008 | Gross | G06Q 10/107 709/206 |
| 2008/0148147 A1* | 6/2008 | Poston | G06F 16/34 715/273 |
| 2008/0201206 A1* | 8/2008 | Pokorney | G06Q 30/02 705/7.29 |
| 2008/0215776 A1 | 9/2008 | Bender et al. | |
| 2009/0012798 A1 | 1/2009 | McConnell et al. | |
| 2009/0013244 A1* | 1/2009 | Cudich | G06F 17/24 715/234 |
| 2009/0240564 A1 | 9/2009 | Boerries et al. | |
| 2009/0254572 A1* | 10/2009 | Redlich | G06Q 10/06 |
| 2010/0115430 A1* | 5/2010 | Skirpa | G06F 17/2247 715/760 |
| 2011/0010386 A1 | 1/2011 | Zeinfeld | |
| 2011/0054647 A1 | 3/2011 | Chipchase et al. | |
| 2011/0072038 A1 | 3/2011 | Burge | |
| 2011/0099071 A1 | 4/2011 | Johnson | |
| 2011/0145064 A1* | 6/2011 | Anderson | G06Q 30/02 705/14.53 |
| 2011/0145836 A1 | 6/2011 | Wheeler et al. | |
| 2011/0145920 A1 | 6/2011 | Mahaffey et al. | |
| 2011/0161112 A1* | 6/2011 | Keefe | G06Q 50/24 705/3 |
| 2011/0208822 A1 | 8/2011 | Rathod | |
| 2011/0264992 A1* | 10/2011 | Vishria | G06F 16/9566 715/208 |
| 2011/0265011 A1 | 10/2011 | Taylor et al. | |
| 2011/0289434 A1* | 11/2011 | Kieft | 715/760 |
| 2012/0023390 A1 | 1/2012 | Howes et al. | |
| 2012/0030553 A1* | 2/2012 | Delpha | G06F 16/435 715/205 |
| 2012/0072835 A1* | 3/2012 | Gross | G06Q 30/0269 715/243 |
| 2012/0117612 A1 | 5/2012 | Grinstein | |
| 2012/0131481 A1 | 5/2012 | Gupta et al. | |
| 2012/0150819 A1* | 6/2012 | Lindahl | G06F 16/2282 707/687 |
| 2012/0150989 A1 | 6/2012 | Portnoy | |
| 2012/0221725 A1 | 8/2012 | Schroeder, Jr. et al. | |
| 2013/0132375 A1 | 5/2013 | Jones et al. | |
| 2013/0159826 A1 | 6/2013 | Mason et al. | |
| 2013/0177298 A1 | 7/2013 | Wong et al. | |
| 2014/0081932 A1* | 3/2014 | Krislov | G06F 21/6209 707/694 |
| 2015/0156154 A1* | 6/2015 | Russell | H04L 51/18 709/206 |
| 2016/0283951 A1* | 9/2016 | Boss | G06Q 30/0201 |
| 2018/0365707 A1* | 12/2018 | Jha | G06Q 30/0245 |

OTHER PUBLICATIONS

"Extract URL 1.4", Retrieved from: <http://www.fileguru.com/Extract-URL/info> on Oct. 19, 2010, 3 pages.

"Final Office Action", U.S. Appl. No. 12/967,990, dated Jun. 13, 2013, 13 pages.

"Non-Final Office Action", U.S. Appl. No. 12/967,990, dated Oct. 3, 2013, 14 pages.

"Non-Final Office Action", U.S. Appl. No. 12/967,990, dated Nov. 9, 2012, 14 pages.

"Notice of Allowance", U.S. Appl. No. 12/967,990, dated Apr. 18, 2014, 15 pages.

"NSDL_DC Metadata Guidelines", Retrieved from: <http://nsdl.org/collection/metadata-guide.php> on Oct. 19, 2010, 14 pages.

Clinton, "More Thoughts on URL Shorteners", Retrieved from: <http://www.google.com/buzz/dclinton/JKoWPTAAyvw/More-thoughts-on-URL-shorteners-This-post-explores> on Oct. 19, 2010, Jun. 14, 2010, 11 pages.

Fitzpatrick, "SHUURL Creates Secure TinyURLs", Retrieved from: <http://lifehacker.com/5156289/shuurl-creates-secure-tinyurls> on Oct. 19, 2010, Feb. 19, 2009, 2 pages.

Flasko "Overview: ado.net Data Services", Retrieved from: <http://msdn.microsoft.com/en-us/library/cc956153.aspx> on Oct. 19, 2010, Aug. 2008, 7 pages.

Pash "See Where a TinyURL is Pointing with Tin Foil Hat", Retrieved from: <http://lifehacker.com/software/tinyurl/see-where-a-tinyurl-is-pointing-with-tin-foil-hat-251849.php> on Oct. 19, 2010, Apr. 12, 2007, 1 page.

* cited by examiner

Fig. 4a

```
<Resource i:type="ArrayOfResource">
 -<Resource>
    <FetchDateTime>2010-11-02T17:41:26.8681728Z</FetchDateTime>
    <HttpCharacterSet>ISO-8859-1</HttpCharacterSet>
    <HttpContentEncoding/>
    <HttpContentLength>-1</HttpContentLength>
    <HttpContentType>text/html</HttpContentType>
    <HttpGetUri>http://twitpic.com/3w5at</HttpGetUri>
    <HttpLastModified>2010-11-02T17:41:26.8681728+00:00</HttpLastModified>
    <HttpResponseUri>http://twitpic.com/3w5at</HttpResponseUri>
    <HttpServer>nginx</HttpServer>
    <HttpStatusCode>OK</HttpStatusCode>
    <WebExceptionStatus>Success</WebExceptionStatus>
  -<ActivityObjects>
   -<d3p1:XElement>
    -<activity:object>
        <activity:object-type>http://activitystrea.ms/schema/1.0/photo</activity:object-type>
        <link rel="preview" href="http://twitpic.com/show/thumb/3w5at" media:height="150" media:width="150"/>
        <link rel="enclosure" href="http://s3.amazonaws.com/twitpic/photos/full653871709.jpg?AWSAccessKeyId=
0ZRYP5X5F6FSMBCCSE82&Expires=1288720685&Signature=kapPLZGuJdaDVXCUVc9qXHjBzjQ%3D"
        media:height="800" media:width="600"/>
    </activity:object>
   </d3p1:XElement>
   -<d3p1:XElement>
    -<activity:object>
        <activity:object-type>http://activitystrea.ms/schema/1.0/service</activity:object-type>
        <link href="http://twitpic.com/3w5at" rel="alternate" type="text/html"/>
        <id>http://twitpic.com/3w5at</id>
        <updated>2010-11-02T17:41:26.8681728Z</updated>
        <published>2010-11-02T17:41:26.8681728Z</published>
```

402

404

406

```
<title>
   Here's @jrodgers giving his Project Mgmt talk. Funny & super ... on Twitpic
</title>
<eatk:ratings>
   <eatk:lang>en</eatk:lang>
   <eatk:pornographic>0.160487</eatk:pornographic>
</eatk:ratings>
<bing:shingle
bing:print="iq1JtfMU5gAaZjltzrCFABIKq4sluhcCoZlbhH3bcACdVnfi6TxCBRayxrKHsTEA42rtH/
KwqACBzkUApQ2kAZOKLy9r9S8ACFP98QKBJwEOvoO1UGD1AKBZkB0xER1AehDizFPdbgBoXJrkptBdAJEl/
P4L09AAzW4qVjyTgAC5fEb5nPv/ASyv1/ClKh4BASN5lsi66gFr019sV00UAO5ZwJ2+yLwB92dndaVNDQGkX/
Wo+1mtAIcW6th86Y8AU5sTzTUudQJHxKaMTYN9AOVvLjYpbT4BL1GEySpiqQCHD0CbLr1KALJwzNyL4+4A+
G2YdTHkSAFK5pUDpTixAEXHvzNU4FcAZ7rsp/
s1OQB5IqPNdeH9AWRzw55Tiz8AuR+b1k7TEAExxl84dNJ1AN02Ir3tkSQBBP/
8w92LfQF2v54aiVFWAEjRkcBE9FgAF7n50BReJACSxT657Ph6AD8VIZaobiwBce+8SlZBhQD7/
lTUTIJvADrisFnUNVoBPUxi0KG24gArrOi9ZYUyAAU+HdI9iAwB1pQSX+LCWwA5hMHnJ7NIAAIUjcKd0B4A9h
g8KIX9dwDaj0kjnu2zAHOEmviPfLACaGTgJ9xYBQH6nQxuKtdcAHsEZ2n2HjMAusJX27jKpwIkSoO6GblkAAUH8r
9QQTcBRqCQLgrwSAFcE+EGPuxPARa/
3hypul8BOPc+EGbg9AD42k9LnjqaAMbY3oufZHgAXOLylWnMKAFNYhAqFAF0AM8n3atHGRkAV59FnfxJmQDz
liE1mwCzALELOlpG7EoC7f5bFI4uEQDnqc5s36hVAGB0b5VsxxMAGnE0uVtQewA8IGYoj9LHAK7xN0yfMTwAIU
VnqdReHgHjjENFP+wVAZizoaqAh3YA"/>
<bing:adult_check bing:has_adult_content="false"/>
</activity:object>
</d3p1:XElement>
</ActivityObjects>
<HtmlRedirectUri i:nil="true"/>
<HttpRedirectUri i:nil="true"/>
<TransitiveRedirectUri>http://twitpic.com/3w5at</TransitiveRedirectUri>
</Resource>
</Resource>
```

Tim O'Brien RT @ebertchicago The villian of "The Dark Knight Rises" will not be The Riddler, Nolan sez. http://j.mp/aYpWHe — 502

18 minutes ago
Reply | Favorite | Retweet | Share

500

⇨

Tim O'Brien RT @ebertchicago The villian of "The Dark Knight Rises" will not be The Riddler, Nolan sez. http://j.mp/aYpWHe

Christopher Nolan reveals title of third Batman film and that 'it won't be the Riddler' | Hero complex – Los

Christopher Nolan's third Batman film will be called "The Dark Knight Rises" and though the Gotham City auteur isn't ready — 506

18 minutes ago
Reply | Favorite | Retweet | Share

LINK EXPANSION SERVICE

RELATED APPLICATION

This application is a divisional of, and claims priority to U.S. patent application Ser. No. 12/967,990, filed on Dec. 14, 2010, the disclosure of which is incorporated by reference herein in its entirety.

BACKGROUND

Technology today provides users with many different alternatives for acquiring information. For example, a user can participate in a social networking service to send and receive information to and from multiple participants, subscribe to one or more RSS feeds, view online photo albums, converse online using instant messaging, and the like. In some cases, the exchange of information can be confined to a set number of characters per exchange, such as in the case of a Short Message Service (SMS) communication. A sender of information may, at times, desire to send information that exceeds a set space allocated to an information exchange. For instance, the sender may wish to send a Uniform Resource Locator (URL) in addition to other information. However, in some cases, the URL alone may consume a large portion, if not all, of the set space. In such a case, a service, typically described as a URL shortener, can be employed to provide a shorter version of the URL, thus allowing for additional information to be included in the exchange.

Oftentimes, URL shorteners can randomize or garble the characters of a resultant URL, such that the resultant URL bears little or no resemblance to the original URL, or the information to which it points. As a consequence, a user who receives a shortened URL may have little or no insight as to the content associated with the shortened URL. Without navigating to the link, the user cannot determine any additional attributes associated with link, such as whether it points to a harmful site, an adult content site, an identified phishing site, or the like.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments enable an application to obtain information associated with a link to content without navigating to the link. The application can be configured to identify a link, receive input to attain information associated with the link, and send a request to a service for the information. In one or more embodiments, a service can be configured to receive a request for information associated with a link, ascertain one or more sources from which to gather the information, determine appropriate mechanisms by which to obtain the information, and acquire the information. Alternately or additionally, the service can further assemble the information into a consumable format, and return the consumable format to a requesting application or device.

BRIEF DESCRIPTION OF THE DRAWINGS

The same numbers are used throughout the drawings to reference like features.

FIGS. 4a and 4b illustrate an example output rendered using the various principles described herein.

FIG. 5 illustrates two examples of an application with a link to content, one rendered without using various principles described herein and one rendered using the various principles described herein.

DETAILED DESCRIPTION

Overview

Figure 1:
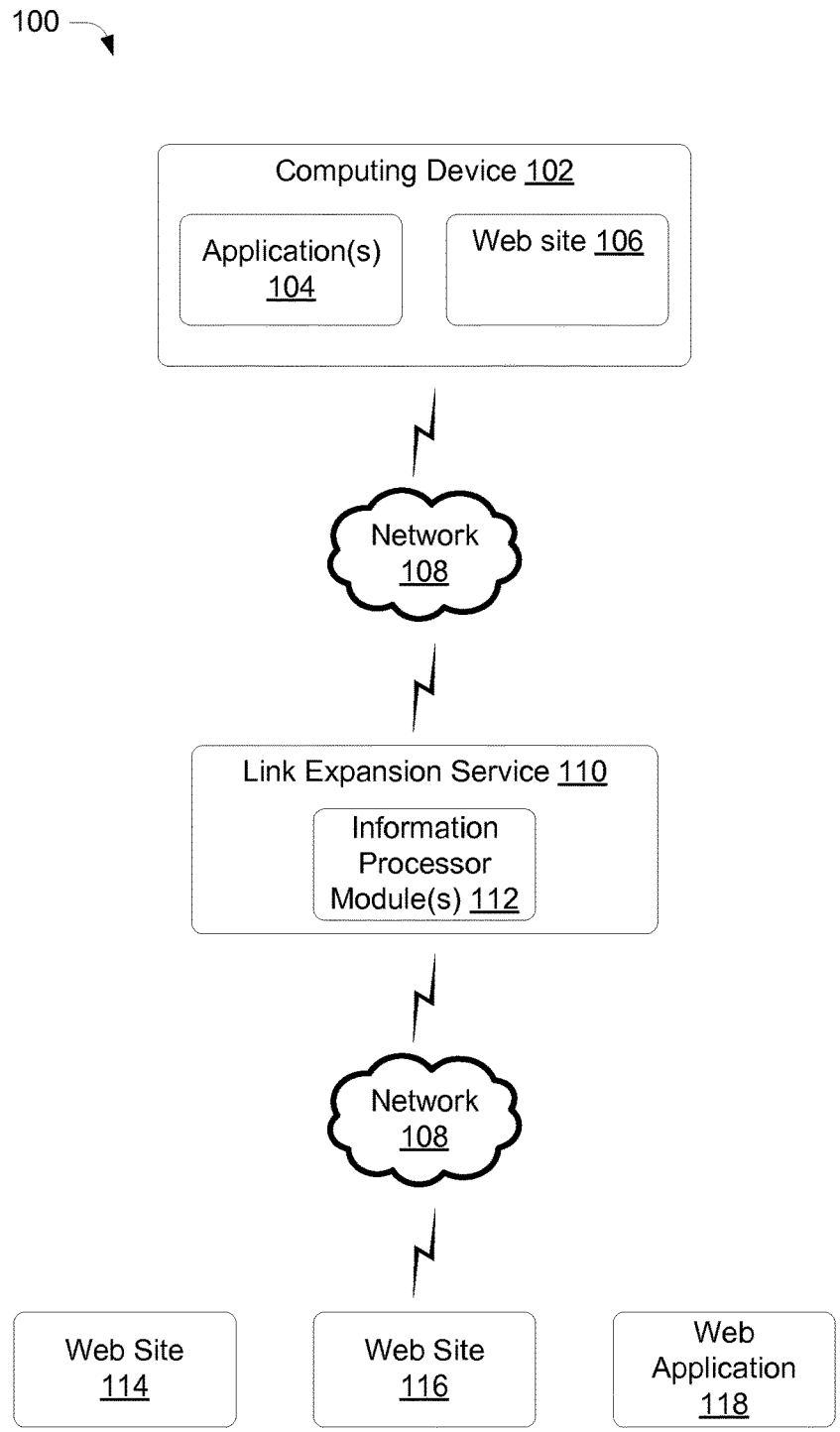
FIG. 1 is an illustration of an environment in an example implementation in accordance with one or more embodiments.

Various embodiments enable an application to obtain information associated with a link to content without navigating to the link. The application can contain a link to content, such as a Uniform Resource Locator (URL). In some instances, the link can be opaque and present little or no information describing the content to which the link points. In some embodiments, the application can be configured to identify the link, determine to obtain information associated with the link, and send a request for the information, such as a preview of the content, an author of the content, and/or a picture associated with the link, and the like. In some embodiments, the information can be obtained from a service, such as a link expansion service. Upon acquiring at least some of the information, the application can be further configured to consume and process the acquired information as applicable.

In one or more embodiments, from the service standpoint, the service can be configured to receive a request for information associated with a link, ascertain one or more sources from which to gather the information, determine appropriate mechanisms by which to obtain the information, and acquire the information. For example, upon receiving a request for information associated with a link, the service can ascertain one or more sources, such as one or more web sites or servers, from which information can be gathered, and query the source(s) for the information. Some source(s) of the information may utilize different modes of access from one another. Accordingly, in some embodiments, the service acquiring the information can be further configured to identify how to obtain the information, such as identifying which mode of access should be utilized for which source.

In one or more embodiments, a service can further assemble acquired information in a consumable format, and return the consumable format to a requesting application. For example, upon receiving some or all of the requested information, the service can format and/or aggregate the information into a composite or individual response(s) and/or document(s), such as such response(s) and/or document(s) comprising information formatted in Extensible Markup Language (XML), JavaScript Object Notation (JSON) or some other suitable format. Upon receiving one or more responses containing information associated with a link, the application can be configured to consume and process the information as applicable, as by enabling display of the information for a user.

In the discussion that follows, a section entitled "Example Operating Environment" is provided and describes one operating environment in which one or more embodiments can be employed. Following this, a section entitled "Expanding Link Information" describes how an application or device can work in concert with a service to acquire information associated with a link. Last, a section entitled "Example Systems" describes example systems that can be used to implement one or more embodiments.

Consider now an example operating environment in which one or more embodiments can be implemented.

Example Operating Environment

FIG. 1 illustrates an example operating environment, generally at 100, in which a device 102 or application(s) 104 can obtain information associated with a link to content in accordance with one or more embodiments. For example, an application can determine to acquire information associated with URL whose address contains limited or no indication of what content the URL points to. Computing device 102 may be configured in a variety of ways. For example, computing device 102 may be configured as a traditional laptop computer, a traditional desktop computer, a mobile phone, a Personal Digital Assistant (PDA), a netbook, a server, and so forth. Computing device 102's application(s) 104 are configured to have access to one or more links to content, such as URLs. Application(s) 104 can be any type of application, such as those that include the ability to identify, contain, and/or enable access to a link to content, such as a word processing application, data entry application, software management application, antivirus protection application, a web browser, a web application, a service, and the like. In some embodiments, application(s) 104 can access and/or display web site content 106. Web site content 106 can be configured to contain a variety of different types of content, such as, by way of example and not limitation, images, video, text, or any other digitally representable content. Alternately or additionally, web site content 106 can be configured to include content from other web sites and/or link(s) to content from other location(s). In some embodiments, computing device 102 can be configured to host web site content 106.

Environment 100 also includes a network 108 which represents one or more data communication networks and/or links. For example, the network 108 may include a wide area network (WAN), a local area network (LAN), a wireless network, an intranet, the Internet, and so on.

Environment 100 also includes link expansion service module 110. Link expansion service module 110 can be implemented in connection with any suitable type of hardware, software, firmware or combination thereof. In at least some embodiments, link expansion service module 110 is implemented in software embodied on some type of tangible, computer-readable storage medium. The computer-readable storage media can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 7.

Link expansion service module 110 is representative of functionality that can receive a request for information associated with a link to content from, for example, computing device 102 and accumulate the information as described below. Link expansion service module 110 can also include one or more software module(s), such as information processor module 112, configured to determine how to obtain the information that is to be provided back to computing device 102. In some embodiments, the information can be obtained from one or more entities, such as web sites 114, 116 and/or web application 118 via network 108. In some embodiments, link expansion service module 110 can be configured to include an information processor module for each different source of information or sub-collections of information sources. The individual information processor modules can be knowledgeable of source-unique or source-associated interfaces through which such information can be acquired. While FIG. 1 illustrates sources of information as being web sites and/or web applications, it is to be appreciated and understood that any accessible entity can be a source of information without departing from the spirit of the claimed subject matter.

Having described an example operating environment, consider now a discussion of how an application can acquire and expand its information associated with a link to content.

Expanding Link Information

As noted above, various embodiments enable an application to obtain information associated with a link to content without navigating to the link. At times, an application on a device may have access to a link to content. Furthermore, the link may contain little or no information to further identify what the link points to. Prior to navigating to the link, it can be desirable to obtain information associated with the link, such as, by way of example and not of limitation, various metadata including a title of the content, author(s) of the content, pictures associated with or contained in the content, music files associated with or contained in the content, previews, enclosures, whether the content includes adult content, what language the content is in, ratings or rankings of the content, a server the content is located on, a version or timestamp of the content, content type, size, icons associated with the content, scripts, formatting, and the like. In these instances, and others, the application can be configured to obtain information associated with the link through a separate entity, such as a link expansion service. In some embodiments, the link expansion service can reside logically between a device containing an application requesting information and one or more sources of the information. Upon receiving a request for information associated with a link, the link expansion service can query the source(s) for the information, format the received information in a consumable format, and return the information to the requesting application.

Figure 2:
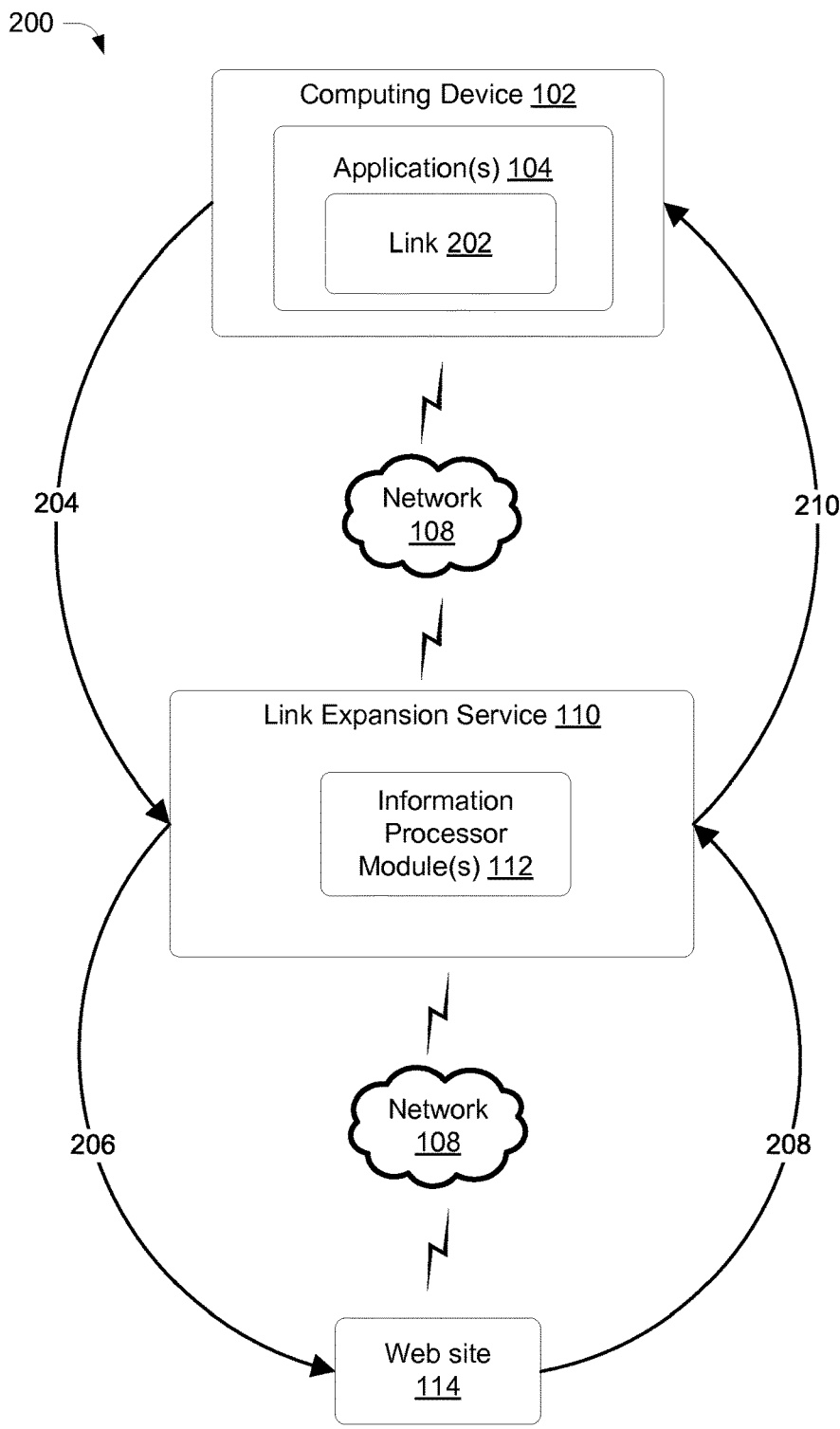
FIG. 2 illustrates an example implementation in operation in accordance with one or more embodiments.

As an example, consider FIG. 2, which illustrates a flow diagram of interactions between computing device 102, link expansion service module 110 and web site 114, as described in FIG. 1. However, some elements of FIG. 1 have not been included in FIG. 2 for the sake of brevity.

Computing device 102 includes application 104 which includes or otherwise has access to link 202. Link 202 represents any suitable type of a link to content, such as a URL, a shortened or truncated URL, an HTML frame shortener, an RSS feed, an application redirect, or any suitable type of resource identifier. In this particular example, application 104 is configured to obtain information associated with link 202. Any type of digitally representable information can be requested or obtained, examples of which are provided above and below.

Flow 204 represents one or more requests from application 104 to link expansion service module 110 for information associated with link 202. In this particular example, the request(s) are sent via computing device 102 and network 108. In some embodiments, flow 204 can be automatically initiated by application 104 in response to identifying link

202 as a link to content. Alternately or additionally, flow 204 can be initiated in response to receiving user input associated with link 202, such as a user hovering a mouse over or highlighting link 202, a user requesting additional information via a drop-down menu, a user right-clicking on link 202, and the like.

In response to receiving a request for information, link expansion service module 110 ascertains one or more sources from which to acquire the information. Additionally, link expansion service 110 determines how to obtain the information associated with link 202, such as by ascertaining how to interface with each source of information. Recall, from the discussion above, that each source of information may implement a different interface to access the information, such as different Application Programming Interfaces (APIs), messaging formats or protocols, and the like. Link expansion service module 110 can be configured to include an information processor module 112 associated with each different interface or interface type, and/or each source of information. Each information processor module can be knowledgeable of how to access the source to obtain information. Alternately or additionally, individual information processor module(s) 112 can be knowledgeable of several different interfaces or interface types. Thus, link expansion service module 110 can support different interfaces through one or more information processor module(s) 112 configured to request and/or process information from the source(s).

FIG. 2 also illustrates web site 114 as a source of information associated with link 202. Flow 206 represents outgoing queries or requests from link expansion service module 110 to the source(s), shown here as being sent to web site 114. Similarly, flow 208 represents one or more responses from the source(s). A response can contain information associated with link 202 or include any suitable type of messaging handshaking Flows 206 and 208 can, collectively, include one or more messages, as well as one or more iterations of messages, between link expansion service 110 and the source(s) over network 108. For instance, in some embodiments, an exchange of information between link expansion service 110 and a source of information may include handshaking messages back and forth between the entities before information associated with link 202 is exchanged.

Upon receiving the requested information, link expansion service module 110 generates at least one response containing the information in a consumable format. Any suitable type of consumable format can suffice such as, by way of example and not limitation, XML, JSON, and the like. In some embodiments, the response(s) contain the formatted information directly. In another embodiment, the response(s) contain the information indirectly by including one or more document(s) containing the formatted information and/or pointers to the information. Upon generating the response(s) and/or document(s), link expansion service module 110 returns the generated response(s) to application 104 via network 108 and computing device 102, as illustrated by flow 210. In other embodiments, link expansion service 110 can delay generating and/or sending response(s) and/or document(s) until all requested information has been acquired. Alternately or additionally, link expansion service 110 can generate and return response(s) containing information associated with link 202 as information is received, or generate one response and/or document and aggregate the response and/or document when information is received. When the information is received by application 104, the application can consume the information and process it as applicable, such as by making it available to the user through a suitably-configured user interface.

Figure 3:
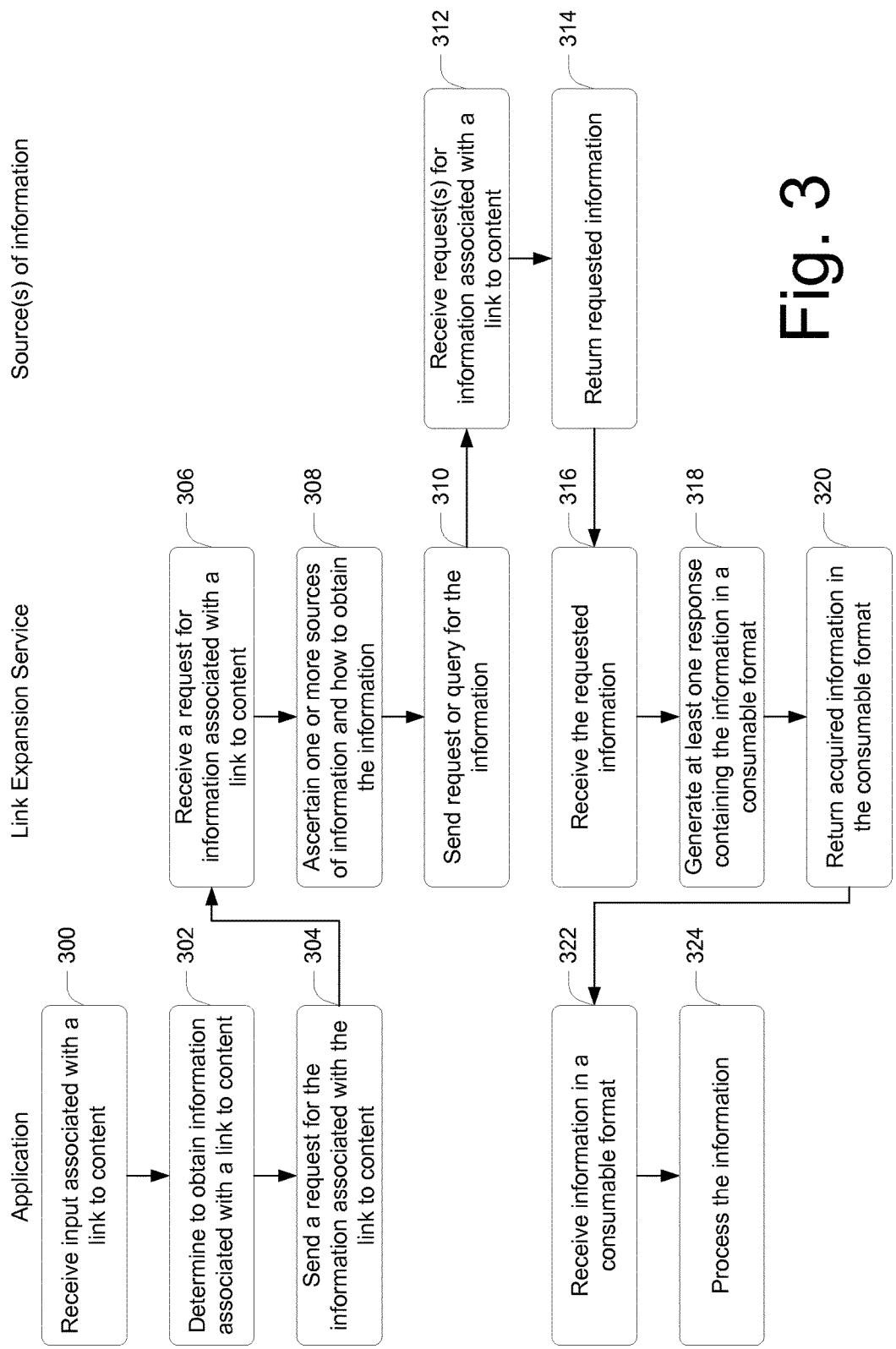
FIG. 3 is a flow diagram that describes steps in a method in accordance with one or more embodiments.

FIG. 3 is a flow diagram that describes steps in a method in accordance with one or more embodiments. The method can be implemented in connection with any suitable hardware, software, firmware, or combination thereof. In at least some embodiments, aspects of the method can be implemented by one or more suitably configured software modules, such as link expansion service module 110. In the discussion that follows, the method is broken out in the flow diagram in three different columns. These columns are utilized to represent the various entities that can perform the described functionality. Accordingly, the column labeled "Application" includes acts that are performed by a suitably-configured application. Likewise, the column labeled "Link Expansion Service" includes acts that are performed by a suitably-configured link expansion service, and so on.

Step 300 receives input associated with a link to content. In some embodiments, the input can be an object with the link embedded within, or appended to, the object, such as a post including text and/or the link. In another embodiment, the input can be user input requesting information associated with the link, examples of which are provided above. A link to content can be represented in any suitable way, such as a URL, a shortened URL, and/or any textual information that can be mapped to an associated URL. Step 302 determines, responsive to receiving the input, to obtain information associated with the link. Step 304 sends a request for information associated with the link. This step can be performed in a reasonable way such as, for example, by sending a request to a suitably-configured link expansion service. In some embodiments, an application requesting the information can be configured to send the request without knowledge of where the information resides.

Step 306 receives the request for information associated with a link to content. This step can be performed in any suitable way such as, for example, by receiving the request at a link expansion service. In at least some embodiments, the link expansion service is located remotely from an application that generated the request. In another embodiment, the link expansion service can reside on the same device as the requesting application. Step 308 ascertains one or more sources from which to obtain the information associated with the request. For example, sources of information can be identified utilizing information that is contained in the request, via a lookup table, through a service, and the like. A lookup table, in some embodiments, can be driven by a data file that does not require code re-compilation and/or re-deployment of the link expansion service. In some embodiments, the request can include the link to content and this link can be used to ascertain an appropriate source. Once the source(s) are ascertained, step 310 sends a request or query for the information to the source(s). This step can be performed in any suitable way such as, by way of example and not limitation, by utilizing a suitably-configured API associated with a particular source. Alternately or additionally, in some embodiments, the link expansion service can issue a somewhat generic information query configured to acquire multiple types of information. For example, the generic information query may not identify any specific information to be returned, but instead simply request any information associated with a link to content. In other embodiments, the link expansion service can be configured to identify specific piece(s) of information and issue one or more queries or requests for the specific piece(s), examples of which are provided above.

Step 312 receives, at one or more information source(s), one or more requests, from a link expansion service, for information associated with a link to content. As noted above, a source of information can be any accessible entity, such as a web site, a web application, a service, and the like. In some embodiments, a source of information can be associated with an address to which the link points. In other embodiments, a source of information can be associated with an address other than the address to which the link points. For example, an information source might comprise a third-party entity that includes returnable information associated with various links. Responsive to receiving the request(s), step 314 returns the requested information to the link expansion service.

Step 316 receives, at the link expansion service, the requested information. Information can be returned in one or more exchanges, as discussed above. Step 318 generates at least one response containing the information in a consumable format, either directly or indirectly via attached document(s), and step 320 returns the acquired information, to the requesting application or entity, in the consumable format. In some embodiments, the link expansion service can be configured to retrieve various forms of metadata from the information source(s) and generate at least one response and/or document formatting the metadata in a consumable and standardized format. As described above, steps 318 and 320 can be performed in an iterative process or a serial process.

Step 322 receives, at the computing device, the information in a consumable format. Upon receipt of the information, step 324 processes the information as applicable such as, by way of example and not limitation, enabling access to the information through a presentable user interface.

Having considered an example method in accordance with one or more embodiments, consider now a discussion of a representation of information in a consumable format, as referred to above.

FIGS. 4a and 4b illustrate an example of information represented in a consumable format. In this particular example, the information is expressed in XML. However, it is to be appreciated and understood that any consumable language or format could be used without departing from the spirit of the claimed subject matter. Furthermore, while this particular example contains a finite number of tags and data content types, any number of tags, data types, or combination thereof, can be included and arranged in any suitable order. The sections presented below are intended represent any digitally representable information associated with content associated with a link, and are not intended to be limiting.

Section 402 illustrates data associated with data exchange. In this particular case, the data exchange pertains to data gathered from an HTTP header, such as the HTTP server (nginx), the HTTP status code (OK), and so forth. Sections 404 and 406 contain data associated with an activity stream. An activity stream is a list of recently performed activities, and can have a standardized format to allow multiple clients or users to interact with the activity stream.

Section 404 includes an activity object associated with the activity stream http://activitystrea.ms/schema/1.0/photo, which represents a "photo" object included in the link content. The photo object can have associated properties, such as a title, a thumbnail, an image page URL, a description, and so forth. In this particular case, section 404 includes "preview" and "enclosure" data associated with the photo object. Section 406 includes an activity object associated with the activity stream http://activitystrea.ms/schema/1.0/service, which represents a "service" object included in the link content. The service object type can represent any entity that performs some form of work, or "service" for other entities, services, etc. The service object can have different properties associated with it than a photo object, such as an icon, a display name, etc. Thus, many different types of objects can be included and represented in a consumable and/or standardized format. As such, the link expansion service can be configured to identify different types of objects, and include any sub-tags or properties associated with each object type. For example, the link expansion service can recognize different types of objects, and, in response to recognizing a particular object, identify the associated sub-tag properties for that object. Alternately or additionally, activity objects can be nested within one another. For example, activity objects that represent people can further have nested activity objects representing photos, comments, pages, and the like.

In addition to identifying and returning standardized formats, such as an activity stream, the link expansion service can identify and return non-standardized data, such as that illustrated in section 408. Non-standardized data can include, by way of example and not limitation, any unique data associated with content. For example, non-standardized data can include pointers to one or more resource, annotation information associated with the content, and the like. In some embodiments, non-standardized data can be expressed alternate ways, such as HTM or plain text.

Having considered an example of information represented in a consumable format, consider now a discussion of how information represented in the consumable format can be suitably presented through a user interface.

FIG. 5 illustrates an example of an application output before a link expansion service is employed, and an application output after the link expansion service is employed.

In the illustrated and described example, output 500 includes link 502, which is displayed as a shortened URL. Looking at the URL, one observes that it contains a collection of text characters which give no indication of the content associated with the link. In some embodiments, a user can request information associated with the link, examples of which are provided above, or the application can be automatically configured to request link information. The request for information is received by the link expansion service, which then acquires the information, formats the acquired information into a consumable format, an example of which is provided above, and returns the information to the requesting application.

Output 504 illustrates an output generated by the application based, at least in part, upon the information returned by the link expansion service. In one or more embodiments, in addition to containing the same information as displayed in output 500, output 504 includes section 506, which not only describes a title of the article to which link 502 points, but provides a preview or excerpt from the article. Thus, information associated with link 502 is obtained without the requesting application navigating to the link.

Having described how a link expansion service can be utilized to expand information associated with a link to content, consider now a discussion of example systems that can be utilized to implement one or more of the above-described embodiments.

Example Systems

Figure 6:
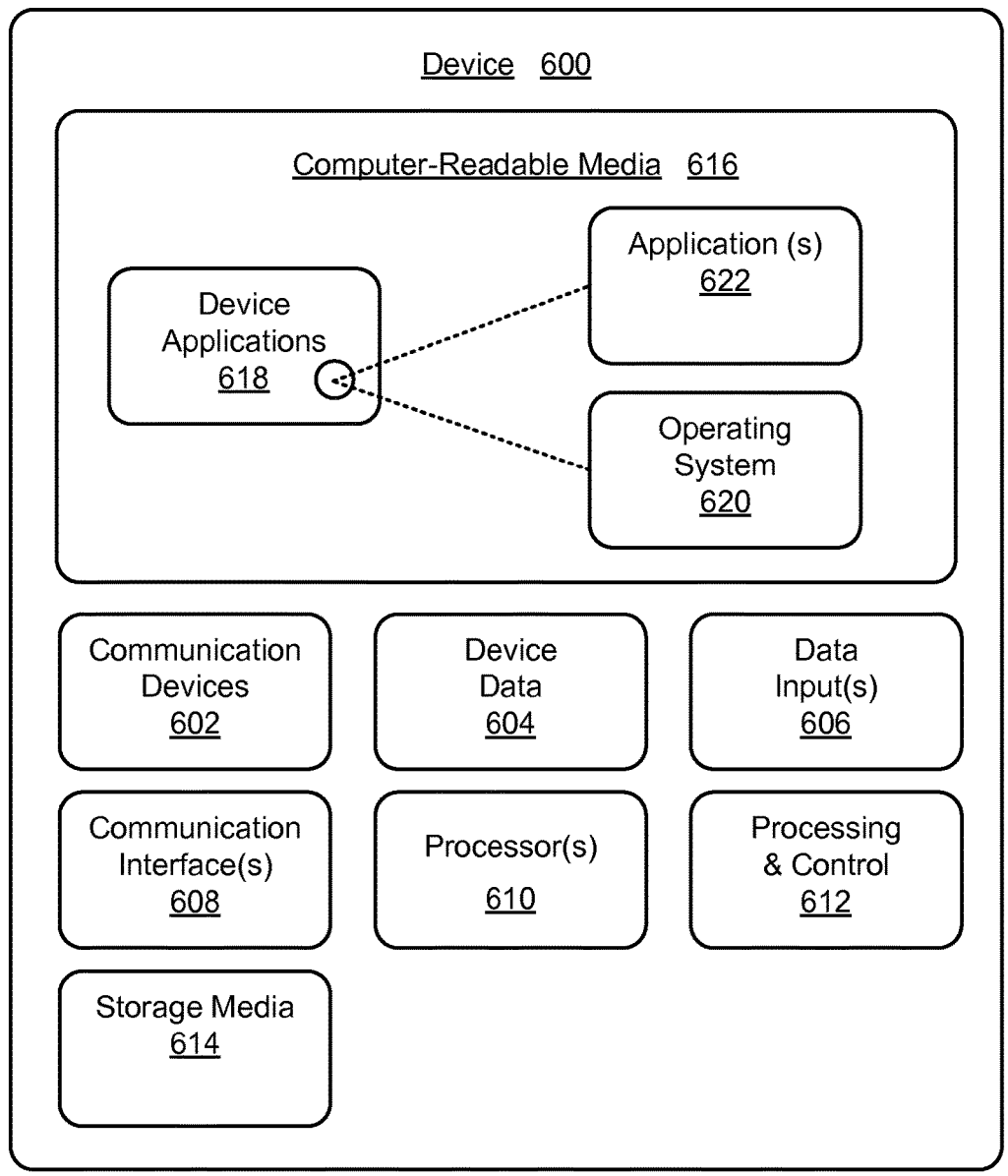
FIG. 6 illustrates an example system that can be used to implement one or more embodiments.
Figure 7:
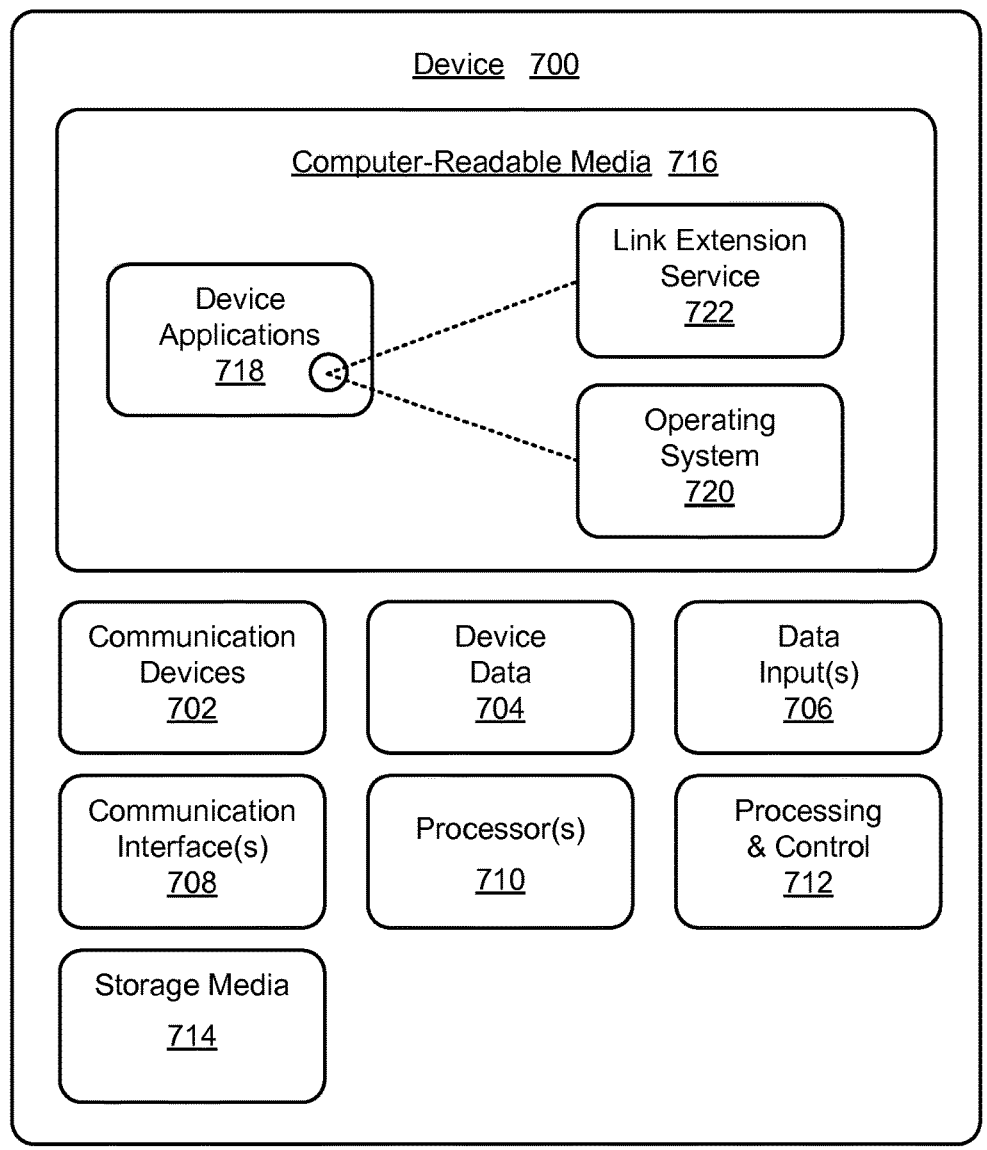
FIG. 7 illustrates an example system that can be used to implement one or more embodiments.

FIG. 6 illustrates various components of an example device 600 that can be implemented as any type portable and/or computer device as described above with reference to device 102 in FIG. 1. FIG. 7 illustrates various components of an example device 700 that can be implemented as any type of portable and/or computer device as described with reference to link expansion service 110 in FIG. 1. For the purposes of brevity, FIG. 6 and FIG. 7 will be described together. Components associated with FIG. 6 will be identified as components prefixed with "6XX", while components associated with FIG. 7 will be identified as components prefixed with "7XX".

Devices 600, 700 includes communication devices 602, 702 that enable wired and/or wireless communication of device data 604, 704 (e.g., received data, data that is being received, data scheduled for broadcast, data packets of the data, etc.). The device data 604, 704 or other device content can include configuration settings of the device, media content stored on the device, and/or information associated with a user of the device. Media content stored on devices 600, 700 can include any type of audio, video, and/or image data. Devices 600, 700 includes one or more data inputs 606, 706 via which any type of data, media content, and/or inputs can be received, such as user-selectable inputs, messages, music, television media content, recorded video content, and any other type of audio, video, and/or image data received from any content and/or data source. User-selectable inputs include one or more input mechanisms by which a user can interact with the device. A user-selectable input mechanism can be implemented in any suitable way, such as a keyboard, a button, a stylus, a touch screen, a mouse, voice input, and the like.

Devices 600, 700 also include communication interface(s) 608, 708 that can be implemented as any one or more of a serial and/or parallel interface, a wireless interface, any type of network interface, a modem, and as any other type of communication interface. The communication interface(s) 608, 708 provide a connection and/or communication links between devices 600, 700 and a communication network by which other electronic, computing, and communication devices communicate data with devices 600, 700.

Device 600, 700 includes one or more processors 610, 710 (e.g., any of microprocessors, controllers, and the like) which process various computer-executable or readable instructions to control the operation of devices 600, 700 and to implement the link expansion functionality as described above. Alternatively or additionally, devices 600, 700 can be implemented with any one or combination of hardware, firmware, or fixed logic circuitry that is implemented in connection with processing and control circuits which are generally identified at 612, 712. Although not shown, devices 600, 700 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Devices 600, 700 also include computer-readable storage media 614, 714, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like.

Computer-readable media 616, 716 provides data storage mechanisms to store the device data 604, 704, as well as various device applications 618, 718 and any other types of information and/or data related to operational aspects of device 600, 700. For example, an operating system 620, 720 can be maintained as a computer application with the computer-readable media 616, 716 and executed on processor(s) 610, 710. The device applications 618, 718 can include a device manager (e.g., a control application, software application, signal processing and control module, code that is native to a particular device, a hardware abstraction layer for a particular device, etc.). The device applications 618, 718 also include any system components or modules to implement embodiments of obtaining link information as described herein.

With respect to device 600, the device applications 618 include application(s) 622 that can contain, access, and/or recognize links to content. With respect to device 700, the device applications 718 include Link Extension Service module 722. Link Extension Service module 722 is representative of software that is configured to receive a request for information associated with a link, acquire the information, and return at least the acquired information to a requesting entity in a consumable format as described above. Modules 622 and 722 are shown as software modules and/or computer applications. Alternatively or in addition, application(s) 622 and/or Link Extension Service module 722 can be implemented as hardware, software, firmware, or any combination thereof.

CONCLUSION

Various embodiments enable an application to obtain information associated with a link to content without navigating to the link. The application can be configured to identify a link, receive input to attain information associated with the link, and send a request to a service for the information. In one or more embodiments, a service can be configured to receive a request for information associated with a link, ascertain one or more sources from which to gather the information, determine appropriate mechanisms by which to obtain the information, and acquire the information. Alternately or additionally, the service can further assemble the information into a consumable format, and return the consumable format to a requesting application or device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims

What is claimed is:

1. A computer-implemented method comprising:
  receiving a request for information associated with a shortened URL link, the shortened URL link referring to content from a requesting application, wherein a URL shortener shortens a URL link to create the shortened URL link, the shortened URL link defined by fewer characters than the URL link, the request including the shortened URL link;
  responsive to receiving the request, determining one or more sources of information from which to acquire the information associated with the shortened URL link without navigating to the URL link, wherein at least one of the one or more sources of information is associated with an address other than an address to which the shortened URL link points and is identifiable using information obtained from the request, via a lookup table, or through a service, and sending a query for the information to the one or more sources of information for the information associated with the shortened URL link;

receiving the information from the one or more sources of information through a respective source-associated interface associated with the shortened URL link in a consumable format, wherein the information is received without the requesting application navigating to the shortened URL link, wherein receiving the information includes exchanging handshaking messages with data associated with a list of recently performed activities, the data being gathered from a hypertext transfer protocol (HTTP) header from the one or more sources of information before the information associated with the shortened URL link is exchanged;

processing the information, based at least in part upon the received information, effective to enable access to the received information in the consumable format by the requesting application, wherein each of the one or more sources of information are processed based on knowledge of the respective source-associated interface by one or more different corresponding information processor modules; and sending the processed information in the consumable format to the requesting application for association with the shortened URL link.

2. The computer-implemented method of claim 1, wherein receiving the information in the consumable format comprises receiving the information formatted in Extensible Markup Language (XML).

3. The computer-implemented method of claim 1, wherein the request comprises a link to content in an appropriate source of said one or more sources of information.

4. The method of claim 1, wherein sending the query for the information further comprises sending the query for the information without knowledge of where the information resides.

5. The computer-implemented method of claim 1, wherein the one or more sources are determined using a table driven by a data file without requiring code recompilation.

6. The computer-implemented method of claim 1, wherein processing the information provides an excerpt associated with the shortened URL link otherwise not identifiable.

7. One or more computer-readable storage memories embodying computer-executable instructions that, responsive to execution by at least one processor, are configured to perform operations comprising:

receiving a request for information associated with a shortened URL link, the shortened URL link referring to content from a requesting application, wherein a URL shortener shortens a URL link to create the shortened URL link, the shortened URL link defined by fewer characters than the URL link, the request including the shortened URL link;

responsive to receiving the request, determining one or more sources of information from which to acquire the information associated with the shortened URL link without navigating to the URL link, wherein at least one of the one or more sources of information is associated with an address other than an address to which the shortened URL link points and is identifiable using information obtained from the request, via a lookup table, or through a service, and sending a query for the information to the one or more sources of information for the information associated with the shortened URL link;

receiving the information from the one or more sources of information through a respective source-associated interface associated with the shortened URL link in a consumable format, wherein the information is received without the requesting application navigating to the shortened URL link, wherein receiving the information includes exchanging handshaking messages with data associated with a list of recently performed activities, the data being gathered from a hypertext transfer protocol (HTTP) header from the one or more sources of information before the information associated with the shortened URL link is exchanged;

processing the information, based at least in part upon the received information, effective to enable access to the received information in the consumable format by the requesting application, wherein each of the one or more sources of information are processed based on knowledge of the respective source-associated interface by one or more different corresponding information processor modules; and sending the processed information in the consumable format to the requesting application for association with the shortened URL link.

8. The one or more computer-readable storage memories of claim 7, wherein receiving the information comprises receiving the information formatted in Extensible Markup Language (XML).

9. The one or more computer-readable storage memories of claim 7, wherein the request comprises an object including the shortened URL link in an appropriate source of said different sources of information.

10. The one or more computer-readable storage memories of claim 7, wherein the different sources are determined using a table driven by a data file without requiring code recompilation.

11. The one or more computer-readable storage memories of claim 7, wherein processing the information provides an excerpt associated with the shortened URL link otherwise not identifiable.

12. A device comprising:
at least one processor; and
one or more computer-readable storage memories embodying computer-executable instructions that, responsive to execution by the at least one processor, are configured to perform operations comprising:

receiving a request for information associated with a shortened URL link, the shortened URL link referring to content from a requesting application, wherein a URL shortener shortens a URL link to create the shortened URL link, the shortened URL link defined by fewer characters than the URL link, the request including the shortened URL link;

responsive to receiving the request, determining one or more sources of information from which to acquire the information associated with the shortened URL link without navigating to the URL link, wherein at least one of the one or more sources of information is associated with an address other than an address to which the shortened URL link points and is identifiable using information obtained from the request, via a lookup table, or through a service, and sending a query for the information to the one or more sources of information for the information associated with the shortened URL link;

receiving the information from the one or more sources of information through a respective source-associated interface associated with the shortened URL link in a consumable format, wherein the information is received without the requesting application navigating to the shortened URL link, wherein receiving the information includes exchanging handshaking messages with data associated with a list of recently performed activities, the data being gathered from a hypertext transfer protocol (HTTP) header from the one or more sources of information before the information associated with the shortened URL link is exchanged;

processing the information, based at least in part upon the received information, effective to enable access to the received information in the consumable format by the requesting application, wherein each of the one or more sources of information are processed based on knowledge of the respective source-associated interface by one or more different corresponding information processor modules; and sending the processed information in the consumable format to the requesting application for association with the shortened URL link.

13. The device of claim 12, wherein receiving the information comprises receiving the information formatted in Extensible Markup Language (XML).

14. The device of claim 12, wherein sending the query for the information further comprises sending the query for the information without knowledge of where the information resides.

15. The one or more computer-readable storage memories of claim 7, wherein sending the query for the information is performed without the request having knowledge of where the information resides.

16. The device of claim 12, wherein the one or more sources are determined using a table driven by a data file without requiring code recompilation.

17. The device of claim 12, wherein processing the information provides an excerpt associated with the shortened URL link otherwise not identifiable.

* * * * *